United States Patent [19]

Coureau

[11] Patent Number: 5,029,809
[45] Date of Patent: Jul. 9, 1991

[54] VALVE-CONTROL DEVICE AND VALVE HAVING SUCH A CONTROL DEVICE

[75] Inventor: Jean C. Coureau, Morangis, France

[73] Assignee: Ets J.C. Coureau, France

[21] Appl. No.: 537,778

[22] Filed: Jun. 14, 1990

[30] Foreign Application Priority Data

Jun. 14, 1989 [FR] France .................. 89 07884

[51] Int. Cl.⁵ .......................................... F16K 3/18
[52] U.S. Cl. .................................. 251/197; 251/167
[58] Field of Search ........... 251/158, 167, 171, 197, 251/199

[56] References Cited

U.S. PATENT DOCUMENTS

| | | | |
|---|---|---|---|
| 1,534,513 | 4/1925 | Fulon | 251/197 |
| 2,626,774 | 1/1953 | Palmer | 251/67 |
| 3,185,435 | 5/1965 | Hauser | 251/158 |
| 3,254,873 | 6/1966 | Knox | 251/171 |
| 4,052,036 | 10/1977 | Schertler | 251/107 X |
| 4,291,861 | 9/1981 | Faria | 251/158 |
| 4,328,947 | 5/1982 | Reimpell et al. | 251/167 X |
| 4,333,631 | 6/1982 | Bösch | 251/159 |
| 4,470,576 | 9/1984 | Schertler | 251/167 X |
| 4,491,145 | 1/1985 | Williams et al. | 137/312 |
| 4,560,141 | 12/1985 | Bosch | 251/167 |
| 4,681,329 | 7/1987 | Contin | 277/167.5 |
| 4,718,637 | 1/1988 | Contin | 251/158 |

FOREIGN PATENT DOCUMENTS

2279002 12/1977 France .

Primary Examiner—John C. Fox
Attorney, Agent, or Firm—Hill, Van Santen, Steadman & Simpson

[57] ABSTRACT

Control device (1) for a valve (2) with a disc (3), comprising a body (4), two seals (5), two openings (7), spacer balls (8), cavities (9) in the inner faces (10) of the body (4) and of the seals (5), and an elastic return member (11) for the seals (5), the disc (3) being able to be moved as a whole and to be deformed in the axial direction, and being capable of assuming three characteristic positions of totally open, closed tight and intermediate, the said control device (1) comprising operation-control means (20), a control member (21), link means (23) comprising, firstly, support means (24) for the disc (3) which pivot about an axis (25) and are integral in rotation with the seals (5), displaceable by pivoting; and, secondly, separate means (26) for operating the disc (3) which are connected to the control member (21) and to the body (4).

17 Claims, 7 Drawing Sheets

VALVE-CONTROL DEVICE AND VALVE HAVING SUCH A CONTROL DEVICE

The invention relates to a valve-control device and valve having such a control device.

Valves with a disc are already known which comprise a central body, a seal and a counterseal which are opposite each other (termed jointly in what follows in the conventional manner as seals) on either side of the body being able to interact with the two seats of two facing openings of the valve, it is possible for intermediate spacer balls to interact with cavities arranged in the inner facing faces of the body and of the seals, and an elastic member for returning the two seals towards each other. The disc is able to be moved as a whole and to be deformed in the axial direction between a retracted state where the balls are housed in facing cavities of the body and of the seals and an expanded state where the balls have left certain cavities of the body or of the seals which are offset from those of the seals or of the body, and the disc is capable of assuming three characteristic positions, totally open where it frees the openings of the valve, closed tight where the seals face each other and are applied tightly to the respective seats, and intermediate where it is placed facing the openings of the valve with the seals spaced axially from their respective seats.

Various embodiments of the control devices for such valves have been proposed. The prior art is well illustrated by the documents FR-2,279,002, U.S. Pat. Nos. 4,291,861, 4,491,145, 4,718,637, 2,626,774, 4,333,631 and 4,681,329.

In the two documents U.S. Pat. No. 4,718,637 and FR-2,279,002, the disc is mounted so as to be able to move slidably. The control device therefore ensures the sliding displacement of the disc.

The control devices of the prior art, and therefore the valves having these control devices, have a certain number of limitations or disadvantages: the maximum pressure difference enabling the valve to function is often limited to 40 millibar. Now for a certain number of applications or in a certain number of circumstances, it would be necessary to have a higher upper pressure difference limit, for example of the order of or greater than 1 bar. Furthermore, the tightness which is an essential parameter for the functioning of the valves is generally problematic and requires the implementation of complex and expensive means. The size is likewise often substantial because the control device has a travel equal to that of the disc (see FR-2,279,002). Alternatively, the travel necessary for the displacement of the disc between its extreme positions is substantial (see U.S. Pat. No. 4,718,637).

SUMMARY OF THE INVENTION

The object of the invention is therefore to overcome the disadvantages of the currently known control devices for valves and, more particularly, to allow functioning with a sufficiently high maximum pressure difference, to obtain the tightness of the control device efficiently but with standard members, to limit the size of the control device and the valve, and to limit the travel necessary for the displacement of the disc. These objectives are combined with the objective consisting in making the disc independent of the casing of the pump for its guidance during its displacement, and for its disassembly.

To this end, the invention proposes a control device for a valve of the type mentioned above, which control device comprises operation-control means by means of which the device is controlled, a control member associated with the operation-control means, mounted slidably between two extreme positions where the disc is respectively in totally open and closed tight positions, link means associated with and controlled by the control member and connected to the disc so as to enable, under the control of the operation-control means, the disc to be displaced from its totally open position into its intermediate position and from the latter into its closed tight position, and vice versa. This control device is such that the link means firstly comprise support means for the disc as a whole which pivot about an axis parallel to and at a distance from its own axis and are integral in rotation with the seals displaceable by pivoting between a first extreme open position and a second extreme position where they are locked for a subsequent unidirectional pivoting; and, secondly, separate means for operating the disc which are connected to the control member and to the body of the disc so as to enable it either to pivot about its axis of pivoting with the seals, as long as the support means are not in their second extreme position, or to pivot relatively about its axis, the seals being locked in rotation but free to slide axially when the support means are in their second extreme position.

The invention also relates to valves having such a control device, these valves being in particular gate valves or swinging valves.

The other features of the invention will be better understood from the description which follows, made with reference to the attached drawings.

DESCRIPTION OF THE PREFERRED EMBODIMENTS

The invention relates to a control device 1 for a valve 2, as well as to valves 2 having such a control device 1.

Figure 1:
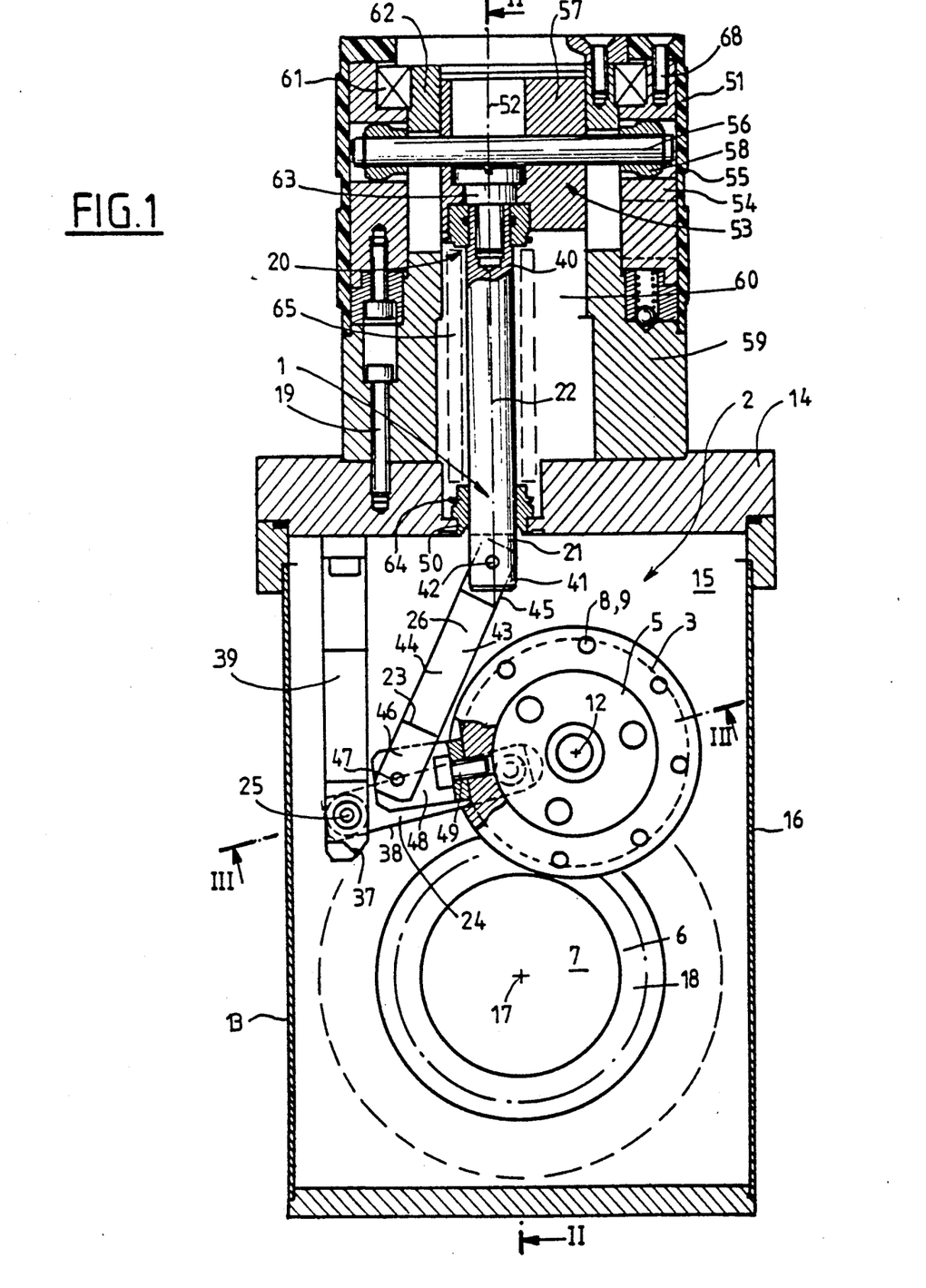
FIG. 1 is a schematic transverse cross-sectional view of a valve with a disc and control device of the invention, the disc being in the totally open position.
Figure 2:
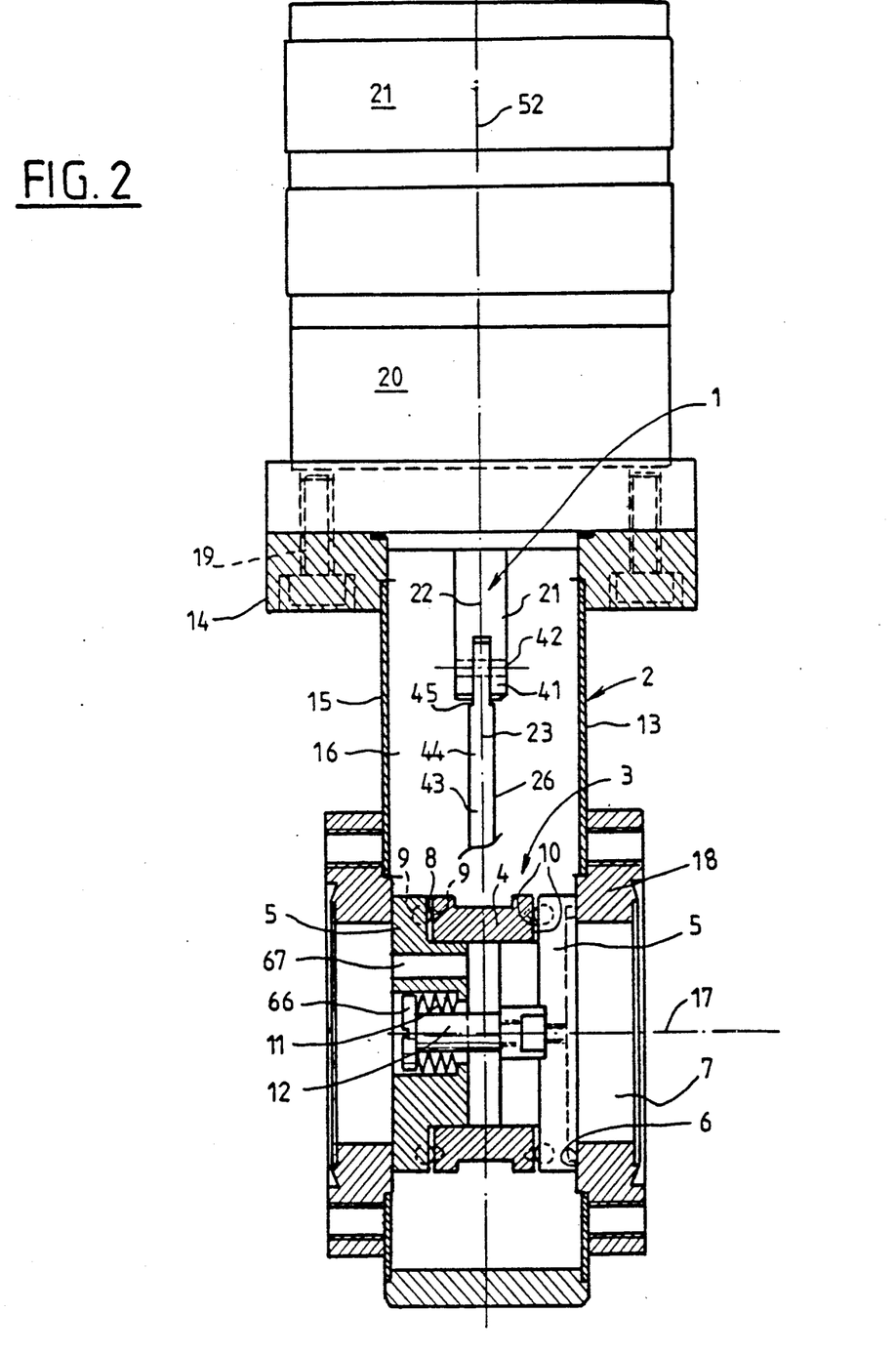
FIG. 2 is a cross-sectional view taken along lines 11—11 of FIG. 1 with the disc being in the closed tight position.
Figure 3:
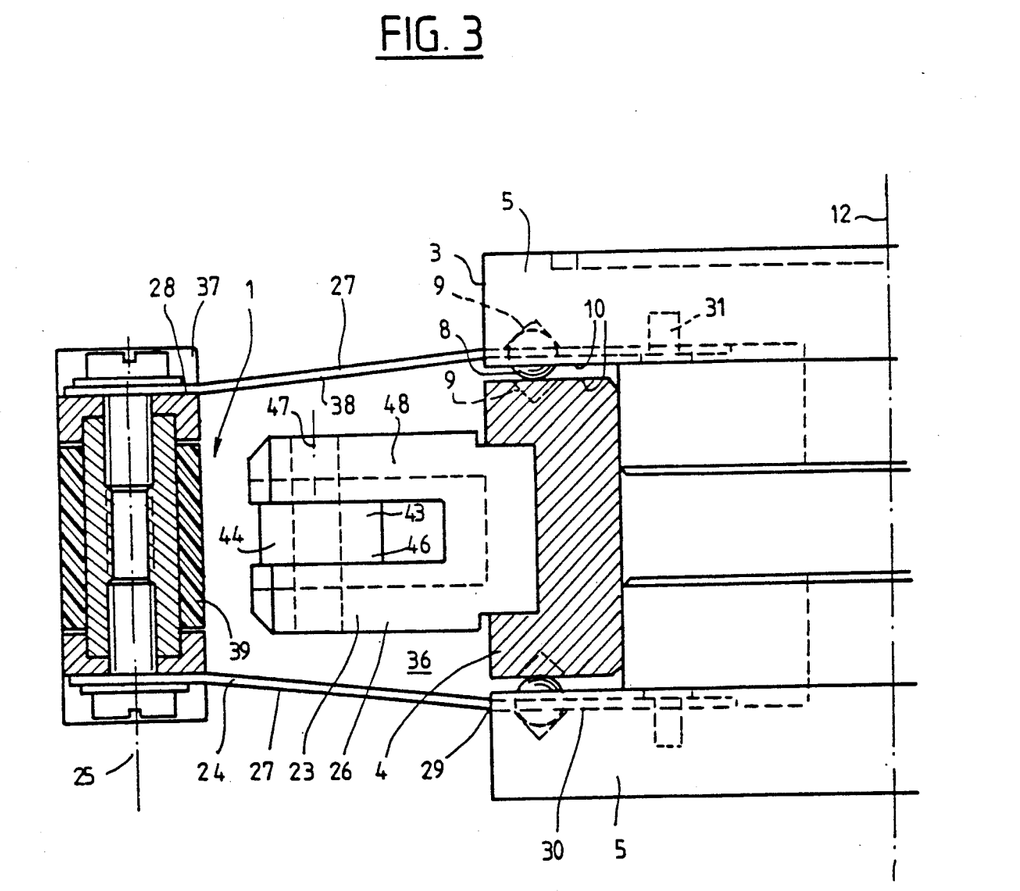
FIG. 3 is an enlarged, partial cross-sectional view taken along lines III—III of FIG. 1 with the disc being shown in the expanded position.
Figure 5:
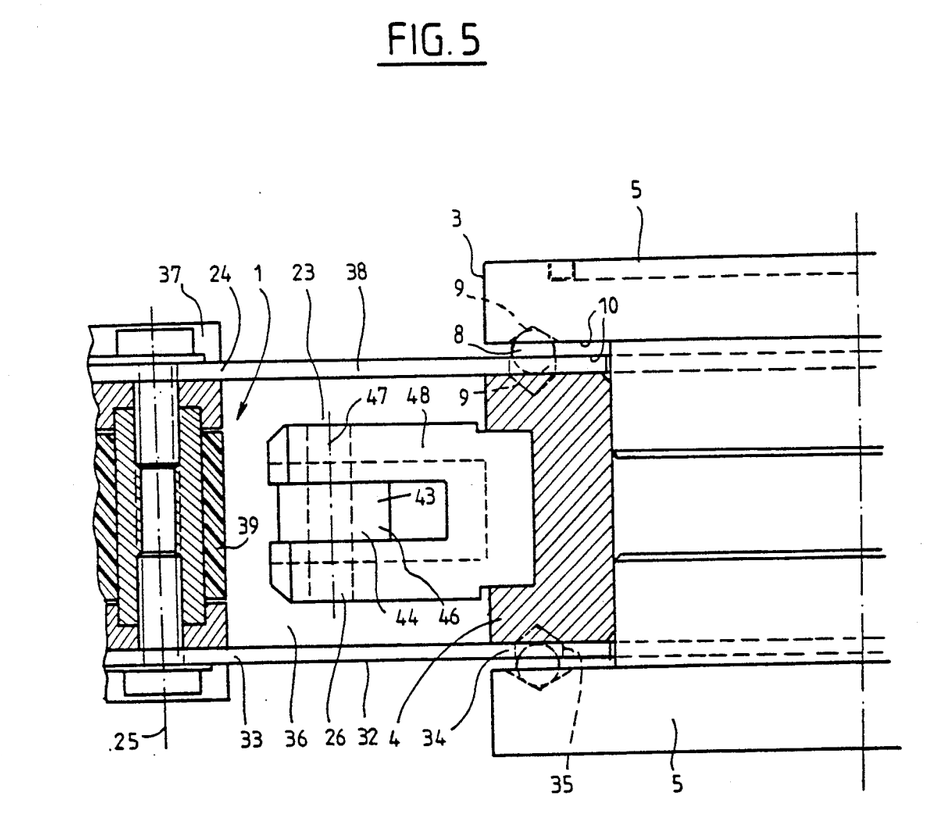
FIG. 5 is an enlarged partial cross-sectional view similar to FIG. 3 of an embodiment of the disc structure.
Figure 7A:
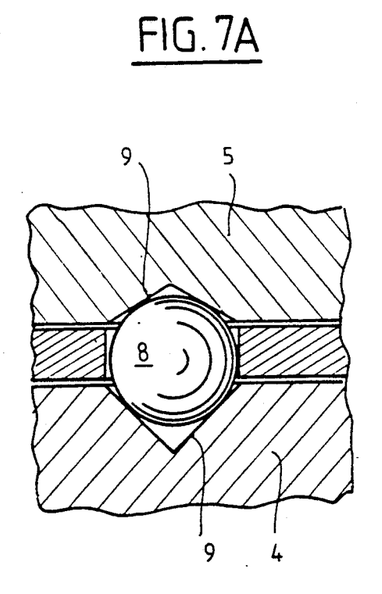
FIGS. 7A and 7B are partial cross-sectional views of the ball of the embodiment of FIGS. 5 and 6, with FIG. 7A illustrating a retracted state and FIG. 7B illustrated an expanded state.
Figure 7B:
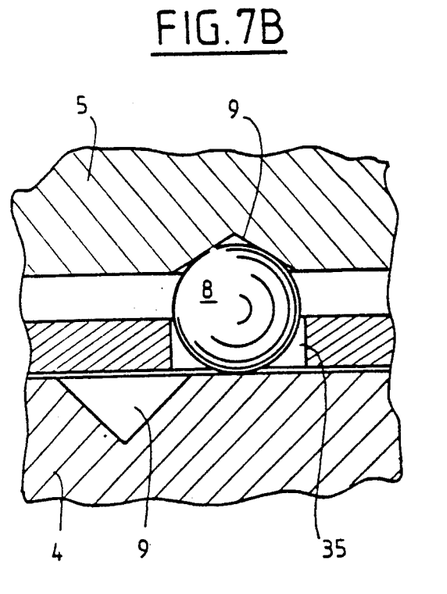

A valve 2 has a disc 3 comprising a central body 4, an opposing seal and counterseal (termed jointly in what follows in the conventional manner as seals 5) on either side of the body 4 being able to interact with the two seats 6 of two facing openings 7 of the valve 2, it being possible for intermediate spacer balls 8 to interact with cavities 9 arranged in the inner facing faces 10 of the body 4 and of the seals 5, and an elastic member 11 for returning the two seals 5 towards each other. The disc 3 can move as a whole and can be deformed in the axial direction along its axis 12, perpendicular to the faces 10, between a retracted state where the balls 8 are housed in the facing cavities 9 of the body 4 and of the seals 5 (FIGS. 2, 7A), and an expanded state where the balls 8 have left the cavities 9 of the body 4 which are offset from those of the seals 5 (FIGS. 3, 5, 7B). The disc 3 may assume three characteristic positions, totally open, intermediately closed and closed tight, respectively. In the totally open position (FIG. 1), the disc 3 totally frees the openings 7. In the closed tight position (FIG. 2), the disc 3 faces the openings 7, the seals 5 being applied tightly to the respective seats 6. In the intermediate position, the disc 3 is placed as a whole facing the openings 7 in a similar manner to that of the closed tight position, but the seals 5 are spaced axially slightly from their respective seats 6.

The valve 2 may be housed in a casing 13 having a main plate 14 forming a support element, two large parallel walls 15 facing each other in which are arranged the openings 7 and lateral walls 16 connecting the large walls 15 and the plate 14 closing the casing 13. This casing 13 is produced rigidly so as to sustain the pressure differences employed with such a valve. The openings 7 have, for example, a circular general shape with axis 17 perpendicular to the large walls 15. The large walls 15 may have, about the openings 7, attached elements 18 forming seats, flanges, etc... The casing 13 has an inner volume which is sufficient to enable the disc 3 to assume its two extreme positions, i.e. its totally open position and its closed or intermediate position.

The control device 1 is fastened to the casing 13, in particular to the plate 14, by fastening members 19. This control device 1 comprises operation-control means 20 by means of which the device 1 is controlled, a control member 21 associated with the operation-control means 20, mounted slidably along an axis 22 between two extreme positions where the disc 3 is respectively in totally open and closed tight positions, link means 23 associated with and controlled by the control member 21 and connected to the disc 3 so as to enable, under the control of the operation-control means 20, the disc 3 to be displaced from its totally open position into its intermediate position and from its intermediate position into its closed tight position, and vice versa.

The axis 22 is, in the embodiment in question, orthogonal to the axes 12 and 17, perpendicular to the plate 14, in particular in its mid-zone, placed substantially at an equal distance from the large walls 15, and meets or is slightly spaced from the axis 17.

In the embodiment described, the operation-control means 20 function manually. The device according to the invention may, however, be adapted for operation-control means functioning electrically, pneumatically or otherwise.

Figure 4:
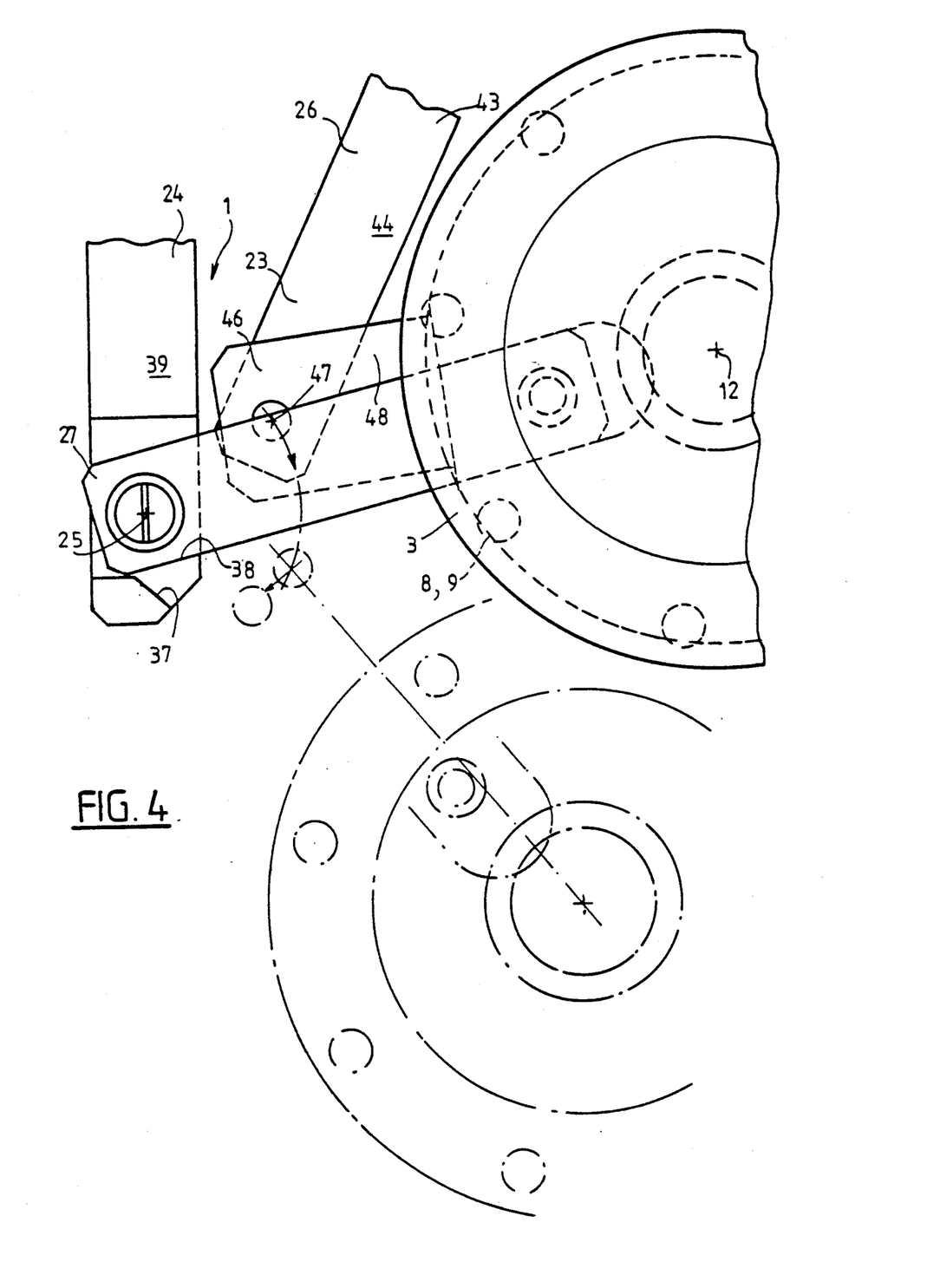
FIG. 4 is an enlarged, elevational view illustrating the constituent elements of the control device and the disc in various positions.
Figure 6:
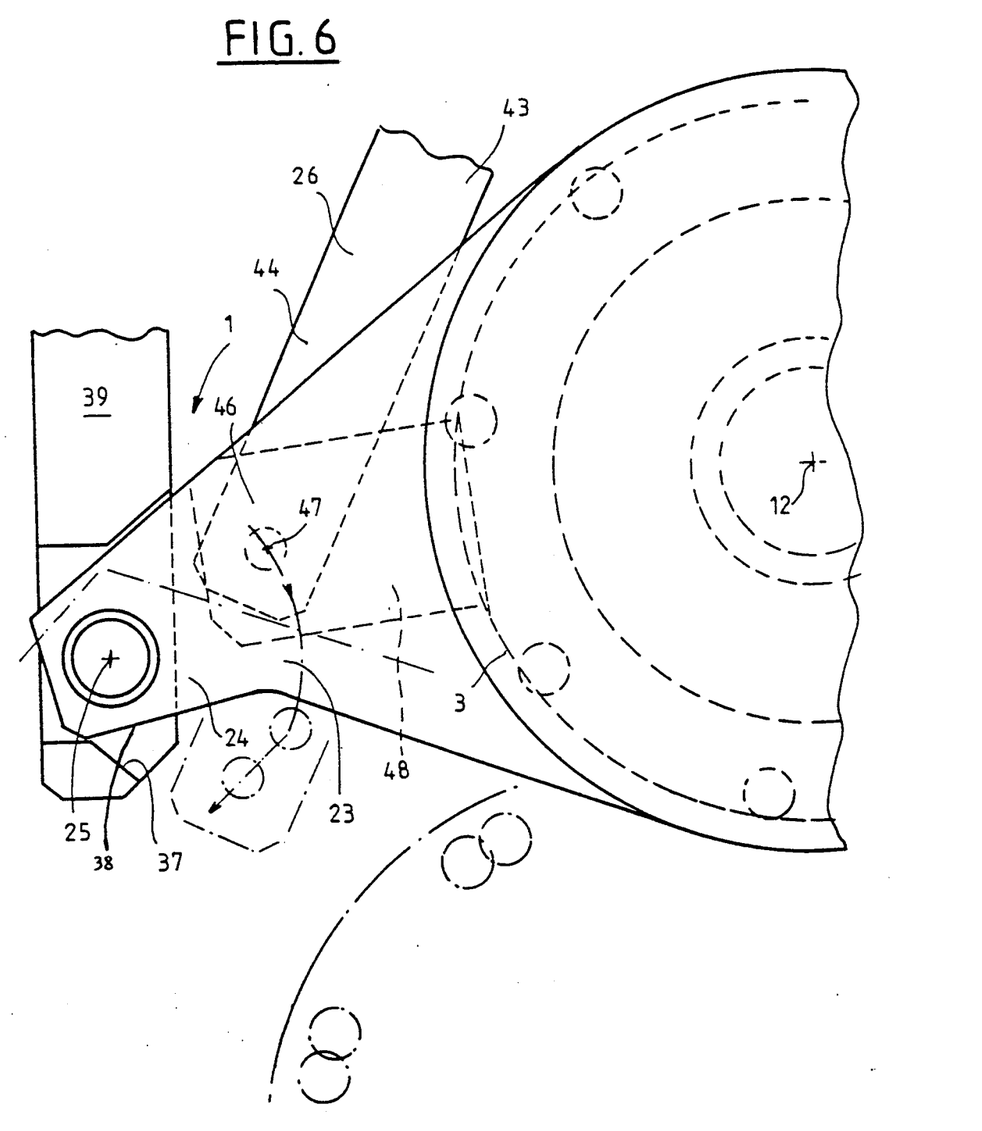
FIG. 6 is an enlarged elevational view similar to FIG. 4 of the embodiment of FIG. 5.

The link means 23 according to the invention firstly comprise support means 24 for the disc 3 as a whole, which pivot about an axis 25 parallel to and at a distance from its own axis 12 and are integral in rotation with the seals 5, displaceable by pivoting between a first extreme open position (in solid lines in FIGS. 4 and 6) and a second extreme position where they are locked for a subsequent unidirectional pivoting (in broken lines in FIGS. 4 and 6).

The axis of pivoting 25 is, for example, situated between the openings 7 and the plate 14, being offset in order to be brought closer to the lateral wall 16.

The link means 23 comprise, secondly, separate means 26 for operating the disc 3 which are connected to the control member 21 and to the body 4 of the disc 3 so as to enable it either to pivot about its axis of pivoting 25 with the seals 5, as long as the support means 24 are not in their second extreme position, or to pivot relatively about its axis 12, the seals 5 being locked in rotation about their axis 12 but free to slide axially along the same axis 12 when the support means 24 are in their second extreme position.

In a first embodiment (FIG. 3), the support means 24 comprise two leaf springs 27 elastically deformable in the transverse direction and placed facing each other and spaced transversely from each other, mounted pivotably at one of their ends 28 about the axis of pivoting 25 and fastened rigidly at the other end 29 to the seals 5 by way of reserved portions 30 arranged in their inner faces 10 and schematically shown fastening members 31 such as screws. In a second alternative embodiment (FIG. 5), the support means 24 comprise two flat rigid sheets 32 placed facing each other and spaced transversely from each other with a fixed spacing, mounted pivotably at one of their ends 33 about the axis of pivoting 25 and associated at their other end 34 with the seals 5 in their pivoting movement about the axis 25, and free relative to the seals 5 in their axial displacement along the axis 12. In this case, the sheets 32 have openings 35 placed facing the cavities 9 arranged on the body 4. The body 4 is encased between the two sheets 32, whilst at the same time being able to glide relatively in rotation relative to them.

In both of the two alternatives, the leaf springs 27 or the sheets 32 extend substantially parallel to and outwards from the seals 5 in planes which are parallel or substantially parallel to the large walls 15. A free space 36 exists between the leaf springs 27 on the one hand, or the sheets 32 on the other hand, permitting the passage or the housing of the link means 23, as has been described.

A fixed stop 37 defines the second extreme position of the support means 24. The narrow side 38 of at least one leaf spring 27 or one sheet 32 may abut the stop 37 in order to define this second extreme position This fixed stop 37 is preferably situated close to the axis of pivoting 25. To this end, a fixed support piece 39 may be provided, fastened rigidly, for example to the plate 14, in particular perpendicular to the latter and near the lateral wall 16, this support piece 39 supporting the axis of pivoting 25 of the disc 3 and being shaped so as to form the stop 37.

The control member 21 is a rod guided so as to be able to slide, exclusively (without being able to pivot). This rod 21 is associated at one of its ends 40, outside the casing 13, with the operation-control means 20, and articulated at its other end 41, situated inside the casing 13, by way of an axis 42, with a linkage 43 associated with the body 4 of the disc 3. The axis 42 is parallel to the axes 12, 17, 25. The guidance of the sliding control rod 21 is obtained by means of appropriate members.

The linkage 43 has a linking connecting rod 44 articulated at one of its ends 45 with the control rod 21 about the axis 42, and at its other end 46 about an axis 47 with a cap 48 fastened rigidly to the body 4 of the disc 3 and extending, relative to the latter, substantially radially and in a transverse mid-plane.

The cap 48 may be fastened to the cylindrical periphery of the central body 4 by means of appropriate fastening members 49. The linking connecting rod 44 and the cap 48 may be housed or may pass through the free space 36 defined above.

The control rod 21 projects from an opening 50 provided in the plate 14, the axis of articulation 42 being situated close to the plate 14. The support piece 39 is, as already mentioned, offset laterally relative to the openings 7 of the valve 2, the control rod 21 placed facing these openings 7 in the central position of the plate 14, the linking connecting rod 44 and the cap 48 which are situated between the disc, the support piece and the plate.

As emerges from the above, the operation-control means 20 may form the subject of various alternative embodiments, the purpose of all of them being to enable the control rod 21 to be displaced, sliding axially along its axis 2. In the embodiment shown in FIG. 1, the operation-control means 20 function manually and have an operating member 51 rotating or pivoting about an axis 52 and mechanical movement-transformation means 53 connected to the operating member 51 and to the control member 21 so as to transform the or rotating movement of the operating member 51 into a sliding movement of the control member 21.

To be more precise, the operating member 51 is in the form of a button rotating or pivoting about the axis 52 coaxial with the axis 22 of the control member 21.

The mechanical movement-transformation means 53 are designed so as to permit the displacement of the disc 3 between its two extreme positions by a limited displacement of the operating member 51, in particular at the maximum one revolution, and preferably one fraction of a revolution, such as a quarter of a revolution. To this end, the mechanical movement-transformation means 53 have a cylindrical sleeve 54 associated with the operating member 51, mounted pivotably about its axis 52 and provided with suitably profiled helical inclines 55. A transverse shaft 56 is carried by a hub 57 and projects from the two sides of the latter. It is provided with rollers 58 interacting with the helical inclines 55. The hub 57 is guided axially and exclusively-slidably along the axis 52 relative to a support piece 59 provided for this purpose with an axial guide 62. The support piece 59 has a central axial hole 60 in which the hub 57 and the control rod 21 are mounted. The support piece 59 also serves to guide the pivoting sleeve 54, as well as the operating member 51, by way of appropriate bearings 61.

The control member 21 is a rod fastened at its end 40 to the hub 57 by means of fastening members 63 and is guided, on the side of its opposite end 41, slidably by a bearing 64 mounted in the opening 50. A sealing member such as a sealing bellows, in particular of the conventional type, 65, is mounted between the two ends of the control rod 21 so as to insulate the inside of the casing 13 from the control device 1 and from the outside.

The disc 3 also has a fastening member 66 enabling the pieces 4 and 5 to be fastened together so as to ensure their coaxial retention, the possibility of them being displaced relatively and pivotably about the common axis 12, and their spacing along the axis 12. This fastening member preferably serves as a support for the return member 11. A gas-removal hole 67 is, furthermore, preferably provided in the disc 3, capable of permitting communication between the two seals 5. Lastly, the seal may have a toroidal sealing strip interacting with the seat 6.

The invention may form the subject of numerous alternative embodiments. The control device which has just been described may be applied equally well to a gate valve as to a swinging valve.

The invention also relates to a valve which has such a control device.

The control device and the valve according to the invention function as follows: initially (FIG. 1), the disc 3 is, for example, in the totally open position. The operator can then act on the operating member 51 so as to cause it to pivot about its axis 52. According to the invention, the control movement is, for example, a quarter of a revolution. The direction of the pivoting movement of the operating member 51 is conventionally that which corresponds to screwing-in or unscrewing. When the operating member 51 pivots, the sleeve 54 is driven pivotably about the axis 52, the operating member 51 being made integral with the sleeve 54 by means of fastening members such as 68. As the hub 57 is prevented from sliding because of the axial guide 62, the same applies to the shaft 56. Consequently, when the sleeve 54 pivots, the rollers 58 are displaced by the helical inclines 55, which causes the hub 57 to slide axially. Since the latter is rigidly fastened to the control rod 21, the latter is displaced slidably and axially along its axis 22. In the original totally open position, the disc 3 is placed between the openings 7 and the plate 14. The axis 42 is at its closest to the plate 14, as is the axis 47.

When the operator causes the operating member 51 to pivot in the closing direction of the valve 2, he causes, as mentioned, the control rod 21 to slide in the direction moving the axis 42 away from the plate 14, or alternatively bringing it closer to the axis 17. Because the disc 3 is supported as a whole by the support means 24, and because the axis of articulation 47 between the linkage 43 and the cap 48 is placed between the disc 3 and the axis 25, the sliding movement of the control rod 21 in the direction emerging from the opening 50 causes the disc 3 carried by the means 24 to be driven pivotably about the axis 25. It should be noted that this pivoting movement of the disc 3 is obtained without requiring the presence of rollers for conveying or guiding the disc 3. This pivoting movement (in the present case and with reference to FIG. 1 in a clockwise direction) is made possible as long as the narrow side 38 does not come to be locked on the stop 37. In the case in question, the disc 3 is pivoted as a whole by the order of 60° about the axis 25. Whereas the totally open position is shown in FIG. 4 by the bold lines, the situation in which the narrow side 38 comes to be locked on the stop 37 is shown by the chain lines. Up until now, the disc 3 was in its retracted position, which enabled it to glide slidably by rotation in the casing 13. In the situation illustrated in chain lines, the disc 3 is in its intermediate position. Subsequent pivoting about the axis 25 is no longer possible, the narrow side 38 coming to be locked on the stop 37. It remains possible, however, over a limited travel to cause the control member 21 to slide, by a pivoting displacement of the operating member 51 by a few degrees. It follows that whereas the seals 5 are locked in position (viewed in elevation with reference to FIGS. 1 and 4), the central body 4 may be displaced pivotably about its axis 12 when the linking connecting rod 44 is displaced. This small relative pivoting movement of the central body 4 relative to the seals 5 causes the balls 8 to escape from the cavities 9 of the body 4, which causes the disc 3 to pass from its retracted state to its expanded state. It should be noted that in this situation the axes 12 and 17 are coaxial, the disc 3 being placed exactly facing the openings 7, which enables them to be closed off.

The opening movement of the valve is realized by comparable operations in reverse.

I claim:

1. A valve having a control device, said valve having a housing with two facing openings with valve seats; a disc having a central body with faces with cavities, balls being disposed in said cavities of the faces of the central body, two seals, each having a first surface for interaction with one of the valve seats of the two facing openings of the valve and a second surface having cavities aligned with the cavities of the face of the central body, said seals being mounted on the central body for relative movement and an elastic member for urging the two seals toward each other; means including a lever arm for mounting the disc for pivotal movement in the housing around a pivot point offset from an axis of the disc between an opened position free of the openings and valve seats of the valve housing, and a closed position wherein the disc is disposed between the two valve seats and the seals are urged tightly against each of the valve seats, said disc having an intermediate position disposed between the valve seats with the seals spaced axially from the respective valve seats; and said control device including operation control means for moving the disc between said positions, said operation control means including a control member slidably mounted for movement between two extreme positions wherein the disc is respectively in the opened position and the closed position, link means associated and controlled by the control member and being connected to the disc and to the control member for pivoting the disc and lever arm between the opened position and the closed position, and means for restraining pivotable movement of the disc and lever arm past the intermediate position wherein continued movement of the control member causes relative rotation between the body and seals to dislodge the balls from the aligned cavities to cause an expansion of the seals away from the faces of the body and into tight engagement with the valve seats.

2. A valve and a control device according to claim 1, wherein the lever arm includes two elastically deformable leaf springs facing each other and spaced transversely from each other and being mounted pivotably at one end on said pivot point and fastened rigidly at the other end to the two seals and extending substantially parallel to and outwardly from the seals.

3. A valve and control device according to claim 1, wherein the lever arm comprises two rigid sheets placed facing each other and spaced transversely from each other with a fixed spacing, said rigid sheets being pivotably mounted at one end to said pivot point and associated at the other end with the seals and movable therewith, said sheets extending substantially parallel to and outwardly from the seals.

4. A valve and control device according to claim 1, wherein the means for restraining is formed by the mounting means including at least one fixed stop defining the intermediate position and engageable with a portion of the lever arm.

5. A valve and control device according to claim 4, wherein the fixed stop is situated close to an axis of the pivot point.

6. A valve and control device according to claim 4, wherein the mounting means includes a fixed support member being rigidly connected to a plate of the housing of the valve and supporting said pivot point for the disc, said fixed support piece forming the stop for engaging the lever arm.

7. A valve and control device according to claim 6, wherein the control member extends through an opening provided in the plate and the link means includes a connecting rod being pivotably connected to the control member adjacent to said plate.

8. A valve and control device according to claim 6, wherein the support member is offset laterally relative to the openings in the valve, said control member being placed to face said opening in a central portion of the plate, the link means having a connecting rod pivotably connected to a cap attached to the disc and situated between the disc and support member.

9. A valve and control device according to claim 1, wherein the control member is a rod having one end connected to the operation control means and the other end being pivotably connected to a first end of a connecting link of the link means.

10. A valve and control device according to claim 9, wherein the link means includes a cap fastened rigidly to the body of the disc to extend substantially radially from the disc along a transverse mid-plane thereof, said cap being pivotably connected to a second end of the second end of the connecting link.

11. A valve and control device according to claim 10, wherein the lever arm is formed by a pair of spaced members forming a free space therebetween, the cap and connecting link being positioned in said free space.

12. A valve and control device according to claim 1, wherein the operation control means includes an operating member mounted for rotation on an axis of rotation, mechanical movement transformation means connected to the operating member and to the control member to transform the rotational movement of the operating member into a linear movement for the control member.

13. A valve and control device according to claim 12, wherein the operating member is in the form of a button which rotates coaxially with the control member.

14. A valve and control device according to claim 12, wherein the mechanical movement transformation means includes a cylindrical sleeve associated with the operating member and being mounted for rotation around said axis of rotation, said sleeve being provided with a helical incline, a transverse shaft being guided by the helical incline and mounted in a hub guided axially and exclusively slidable in a support piece.

15. A valve and control device according to claim 14, wherein the control member is a rod fastened at one of its ends to the hub and guided at one point by a bearing mounted in a plate of the valve housing.

16. A valve and control device according to claim 15, wherein the control member includes a bellows extending from the plate to the hub and surrounding the rod.

17. A valve and control device according to claim 12, wherein the control member is surrounded by a sealing bellows.

* * * * *